(12) United States Patent
Archibald et al.

(10) Patent No.: US 6,240,638 B1
(45) Date of Patent: Jun. 5, 2001

(54) METHOD OF MANUFACTURE OF A FULL-FACE WHEEL ASSEMBLY

(75) Inventors: Kenneth R. Archibald, Canton, MI (US); Melvyn Leroy Scott, Jr., Huntington, IN (US)

(73) Assignee: Hayes Lemmerz International, Inc., Northville, MI (US)

( * ) Notice: Subject to any disclaimer, the term of this patent is extended or adjusted under 35 U.S.C. 154(b) by 0 days.

(21) Appl. No.: 07/906,492

(22) Filed: Jun. 30, 1992

Related U.S. Application Data (63) Continuation of application No. 07/711,498, filed on May 31, 1991, now Pat. No. 5,360,261, which is a continuation of application No. 07/442,123, filed on Nov. 28, 1989, now abandoned, which is a continuation-in-part of application No. 07/407,983, filed on Sep. 15, 1989, now abandoned.

(51) Int. Cl.⁷ .............................. B23P 17/00; B21K 1/38
(52) U.S. Cl. .................................. 29/894.322; 29/894.35; 29/412
(58) Field of Search ................ 29/894.322, 894.354, 29/894.32, 894.35, 894.351, 894.352, 894.353, 412, 414, 415, 447; 301/63 DD, 63 R (56) References Cited

U.S. PATENT DOCUMENTS

| | | | |
|---|---|---|---|
| 1,691,491 | * 11/1928 | Nelson | 29/894.354 |
| 2,035,142 | * 3/1936 | Campbell | 29/414 |
| 2,185,347 | * 1/1940 | Le Jeune | 29/894.354 |
| 2,200,569 | * 5/1940 | Whitten | 29/894.354 |
| 2,247,002 | * 6/1941 | Rendleman | 29/894.354 |
| 3,264,719 | * 8/1966 | Adams et al. | 301/63.1 |
| 3,506,311 | * 4/1970 | Nobach | 29/894.323 |
| 3,612,614 | * 10/1971 | Ware | 29/894.322 |
| 4,106,172 | * 8/1978 | Bache | 29/894.322 |
| 4,610,482 | * 9/1986 | Overbeck et al. | 29/894.323 |

FOREIGN PATENT DOCUMENTS

| | | | |
|---|---|---|---|
| 1181230 | * 6/1959 | (FR) | 301/63.1 |
| 576398 | * 5/1958 | (IT) | 301/63.1 |
| 63-40628 | * 2/1988 | (JP) | 29/894.351 |

\* cited by examiner

Primary Examiner—P. W. Echols
(74) Attorney, Agent, or Firm—MacMillan, Sobanski & Todd, LLC (57) ABSTRACT

A full face wheel assembly comprises a full face disc and a rim. The disc is preferably cast from aluminum whereas the rim is rolled from aluminum strip stock. The full face disc comprises an outboard bead seat flange, an outboard bead seat and an outboard well side wall. The disc may also include lightener pockets or a continuous re-entrant channel adjacent the outboard bead seat. The rim comprises an inboard bead seat flange, an inboard bead seat, an inboard leg, and a deep well. The disc and rim are welded together in the deep well or bead seat regions by gas metal arc welding, electron beam welding or other suitable welding technique.

11 Claims, 7 Drawing Sheets

METHOD OF MANUFACTURE OF A FULL-FACE WHEEL ASSEMBLY

CROSS REFERENCE TO CO-PENDING APPLICATION

This patent application is a continuation of patent application Ser. No. 07/711,498, filed May 31, 1991, now U.S. Pat. No. 5,360,261 which is a continuation of patent application Ser. No. 07/442,123, filed Nov. 28, 1989, now abandoned, of which is a continuation-in-part of patent application Ser. No. 07/407,983, filed Sep. 15, 1989, now abandoned.

BACKGROUND OF THE INVENTION

This invention relates generally to a full face vehicle wheel and more specifically to full face vehicle wheel assemblies comprising a full face cast disc and a rolled rim welded to the disc in the vicinity of the deep well of the rim.

Conventionally, vehicle wheels adapted for receiving pneumatic tires have been fabricated from sheet steel. The rim is formed from a strip of steel which is formed into a hoop. The ends of the hoop are butt-welded and the preform is rolled to form the inboard and outboard tire bead retaining flanges, the bead seats and the drop-center well of the rim. Within the interior of the rim is affixed a disc or spider having a centrally disposed pilot hole and a plurality of mounting holes. Traditionally, the disc or spider was disposed at or near the axial mid-plane of the wheel.

With the advent of front wheel drive vehicles which tend to include not only larger brake assemblies but also steering and drive components adjacent the front wheel hubs, it has become necessary to offset the wheel disc from the axial mid-plane position outwardly toward the outboard bead retaining flange. Such full face wheels are the subject of this patent application.

Because the disc has moved outwardly to a more visible position, the wheel has taken on increased significance as a styling element of the vehicle. Because the full face wheel may be produced by such processes as casting or forging it can provide a highly stylized, decorative and distinctive appearance. Accordingly, significant attention has been paid to not only the design but also the mechanical configuration of such full face wheels within the last several years.

For example, U.S. Pat. No. 2,545,130 discloses a split rim wheel assembly wherein the rim members include a rim portion, a disc portion and a web connecting the rim and disc portions. The web is formed so as to have a convex configuration for improved strength.

U.S. Pat. No. 2,551,783 discloses a wheel assembly comprising first and second split rim sections which are welded together and a disc or spider which is welded to the underside of the deep well bottom, formed by the two rim sections, in the vicinity of the weld which unites the two split rim sections.

U.S. Pat. No. 3,506,311 discloses a two piece vehicle wheel assembly comprising a full face, non-ferrous, cast disc and a ferrous, rolled or stamped rim welded together near the intersection of the outboard bead seat provided on the rim and an outboard bead seat flange provided on the disc. The disc is cast around a ring, referred to as a welding anchor, which is friction welded to the outboard free edge of the rim.

U.S. Pat. No. 3,874,736 discloses a method for uniting two cast or forged elements of a split rim vehicle wheel using an electron beam welding technique. In one embodiment of a split rim, disclosed in the patent, a first rim member comprises an inboard bead seat flange, an inboard bead seat, an inboard safety hump, an inboard deep well side wall and a deep well bottom. A second rim member comprises a central disc portion, an outboard, deep well side wall, an outboard safety hump, an outboard bead seat and an outboard bead seat flange.

U.S. Pat. No. 4,363,347 discloses a two piece wheel assembly comprising an outboard rim member and an inboard rim member including an integrally formed disc. The outboard rim member comprises an outboard bead seat flange, an outboard bead seat, an outboard safety hump, an outboard deep well side wall and a deep well bottom. The inboard rim member comprises an inboard seat flange, an inboard bead seat, an inboard safety hump, an inboard leg, an inboard deep well side wall and a disc member.

U.S. Pat. No. 4,610,482 discloses a two piece, full face wheel assembly comprising a stamped disc, which includes an outboard bead seat flange, and a rolled rim having an outboard free edge which is welded to the disc at the base of the outboard bead seat flange provided thereon. According to the patent, it is preferred that the outboard free edge of the rim be turned radially inwardly to form, with the disc, a trench for welding the rim and disc together. The patent discloses that the disc is made from sheet steel.

A two piece wheel assembly comprising a forged disc and a rolled rim is disclosed in a Wexler brochure entitled "Super Forge". The rim includes an outboard bead seat and is welded to the disc near the intersection of the outboard bead seat and an outboard bead seat flange provided on the disc.

SUMMARY OF THE INVENTION

The present invention is a full face wheel assembly comprising a full face cast or forged disc and a rolled rim. The full face disc comprises an outboard bead seat flange, an outboard bead seat, an outboard safety hump and outboard deep well side wall. The rolled rim comprises an inboard bead seat flange, an inboard bead seat, an inboard safety hump, an inboard leg, an inboard deep well side wall and a deep well bottom. The rim and disc are welded together to form a full face wheel. The disc may also include pockets or a continuous re-entrant channel disposed radially inwardly from the outboard safety hump. The invention is also concerned with a method for producing a full face wheel wherein a dual rim preform is produced by known rim rolling techniques and the rolled preform is split to produce two rims for use in producing wheels according to the invention. Spin forming the rim is also disclosed. The wheel components may be secured together by gas metal arc welding or electron beam welding.

It is an object of the present invention to provide an improved wheel assembly which combines the design freedom afforded by casting the face with the higher strength to weight ratio of the rim afforded by metal forming processes.

It is a further object of the invention to provide an improved disc for incorporation in a full face wheel assembly.

It is yet another object of the invention to provide an improved method for producing full face wheels comprising cast or forged discs and formed rims.

Other objects and advantages of the present invention will become apparent from the following detailed description of the invention, reference being had therein to the attached drawings.

DESCRIPTION OF THE PREFERRED AND ALTERNATE EMBODIMENTS

Figure 1:
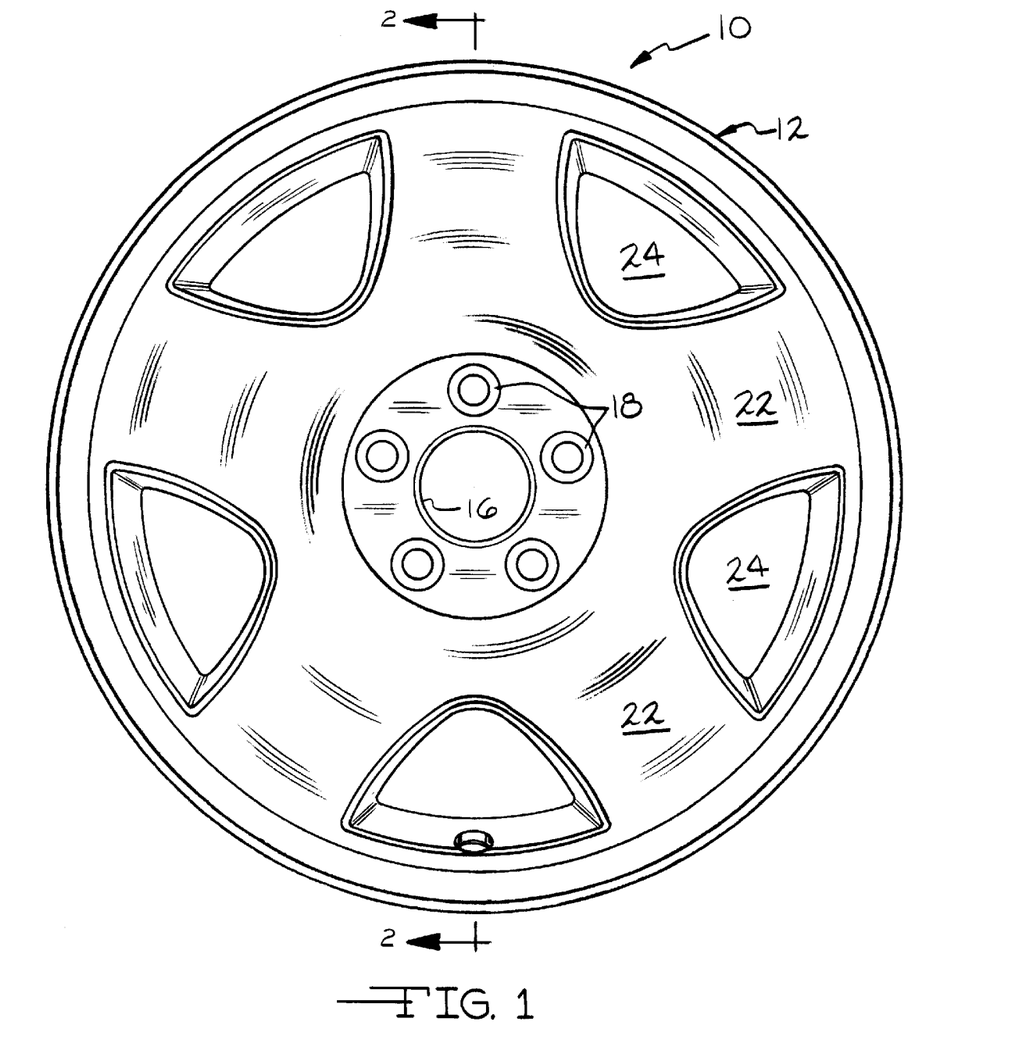
FIG. 1 is a front view of a full face wheel according to the present invention.
Figure 2:
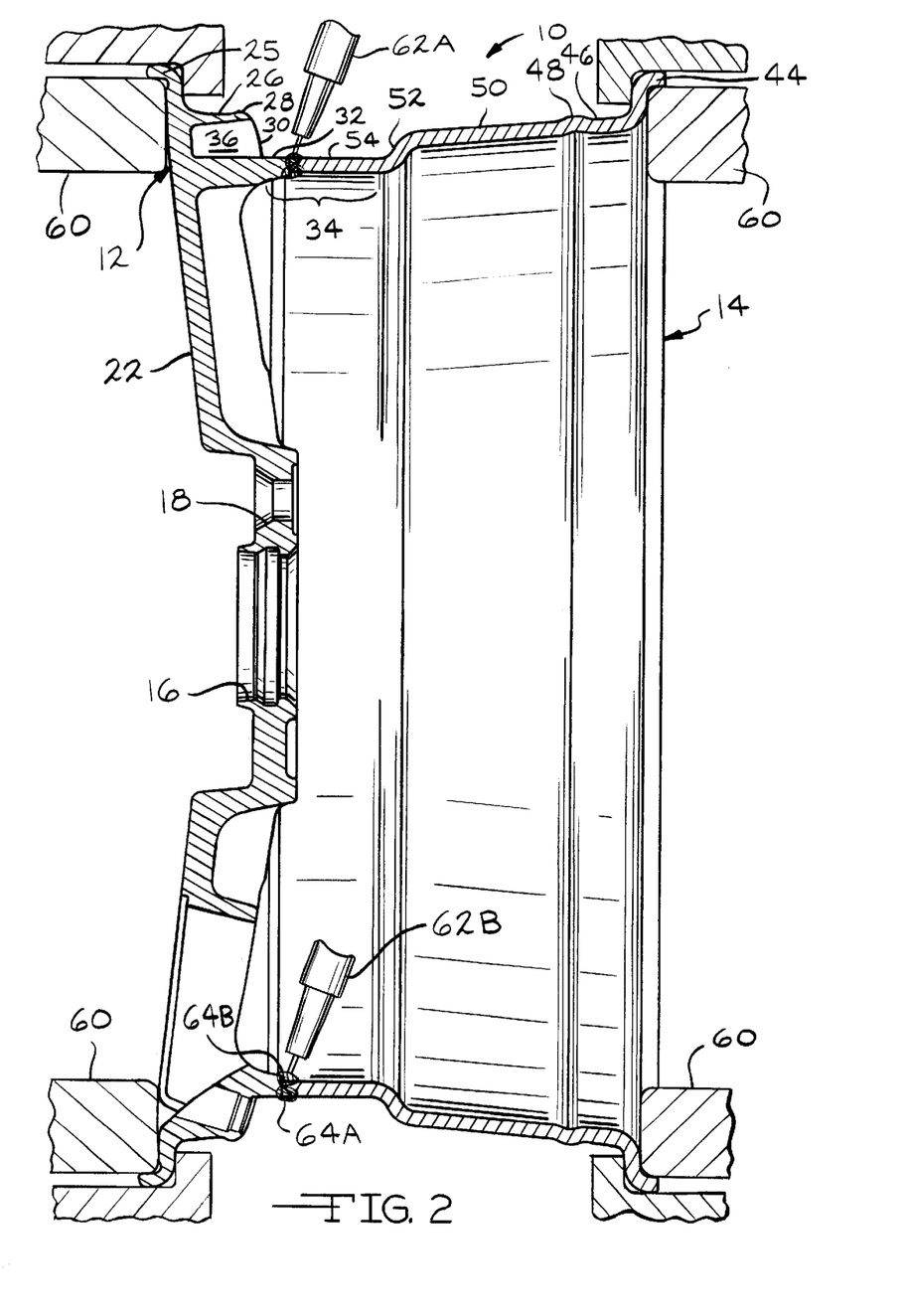
FIG. 2 is a sectional view of the wheel illustrated in FIG. 1, taken along the line 2—2.

Referring now to FIGS. 1 and 2, a full face wheel assembly according to the present invention is illustrated and generally designated by the reference numeral 10. The full face wheel assembly 10 comprises an axially outboard full face or disc 12 and an axially inboard rim 14. As noted above, the styling flexibility offered by full face wheel designs is great. Accordingly, the design of the disc 12 appearing in the drawing figures should be considered illustrative and exemplary only. It will be appreciated that the present invention is adaptable to a broad range of configurations of the disc 12 and the present invention should be neither limited nor defined by the disc 12 illustrated herein.

The disc 12 includes a, centrally disposed pilot opening 16 and a plurality of apertures 18 uniformly disposed thereabout. The apertures 18 receive the mounting studs (not illustrated) which extend from the vehicle wheel hub (not illustrated). The disc 12 includes a plurality of spokes 22 or other structures which define a plurality of through openings 23. The through openings 23 assist in ventilation of the vehicle disc brake assemblies or other components positioned within the wheel assembly 10. The disc 12 further includes an outboard bead retaining flange 25, an outboard bead seat 26 and an outboard safety hump 28. Finally, the disc 12 includes an outboard deep well side wall 30 and an outboard portion 32 of the deep well 34.

Figure 6:
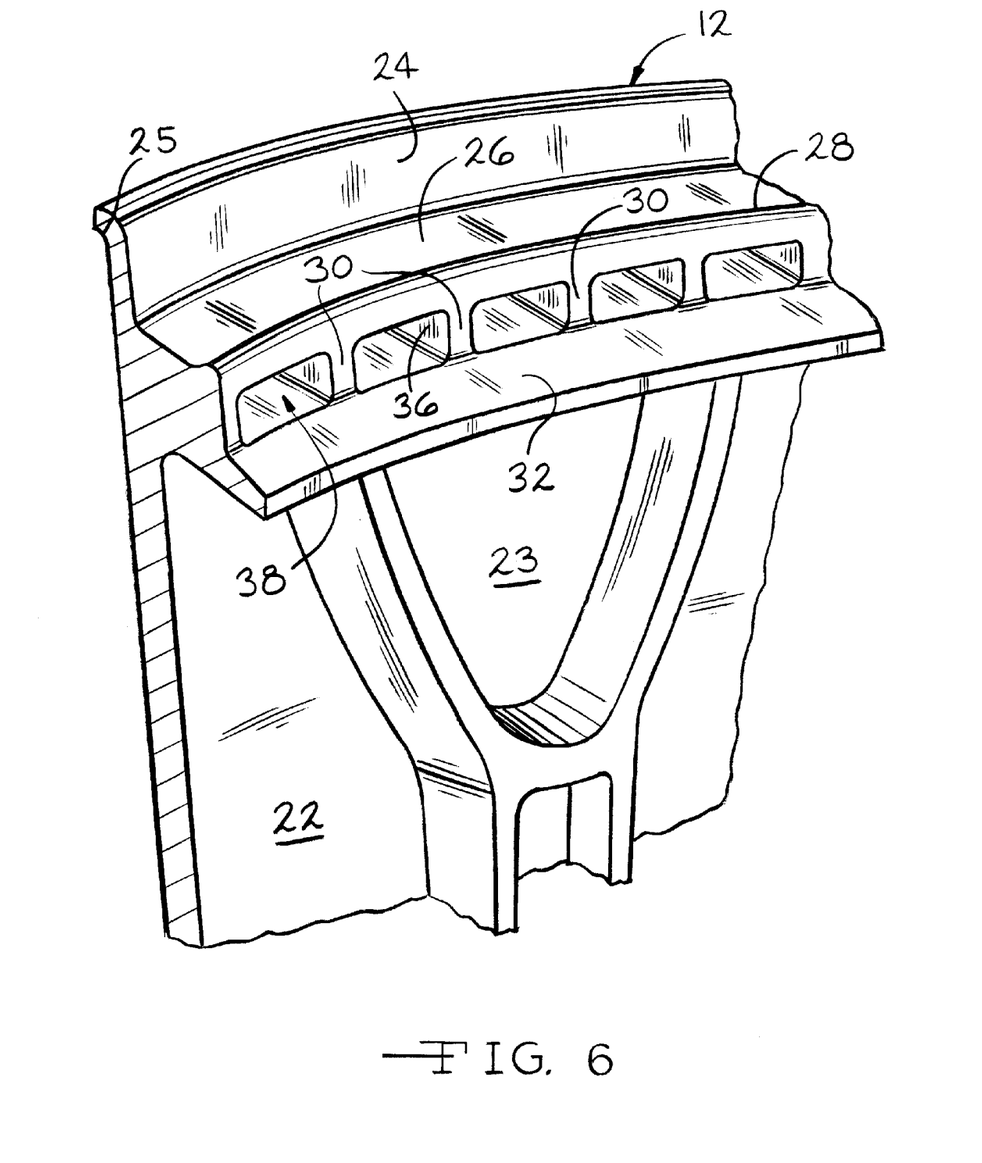
FIG. 6 is a rear perspective view of a portion of a full face disc according to the present invention illustrating weight reduction pockets disposed adjacent the bead seat.

As illustrated in FIG. 6, the outboard deep well side wall 30 comprises a plurality of circumferentially spaced apart, radially outwardly extending webs 36 which define a plurality of lightener pockets 38. The lightener pockets 38 significantly reduce the weight of the disc 12 and of the full face wheel assembly 10. More importantly, the weight reduction is relatively proximate the periphery of the disc 12 which significantly reduces its mass moment of inertia. It will be appreciated that the lightener pockets 38 open inwardly and are in communication with the pressurized volume of air within the tire received upon the wheel assembly 10. Accordingly, the lightener pockets 38 are not exposed to the environment and do not collect debris, water and other environmental hazards to which the wheel assembly 10 is subjected.

The disc 12 may be readily cast in a mold which is relatively simple compared to the complex mold required to produce a single piece cast wheel. Alternatively, the disc 12 may be forged. Preferably, the disc 12 is made of aluminum, magnesium or similar lightweight, high strength material.

Turning again to FIGS. 1 and 2, the rim 14 includes an inner bead seat flange 44, an inner bead seat 46, an inner safety hump 48, a leg 50, an inner deep well side wall 52 and an inner portion 54 of the deep well. Preferably, the rim 14 is fabricated by butt welding the ends of a strip of aluminum formed into a hoop and shaped by suitable rolling operations into the configuration illustrated in FIG. 2. Again, the rim material is preferably aluminum but may also be magnesium, or similar lightweight, high strength material.

The inwardly directed face of the disc 12 adjacent the outboard portion 32 of the well 34 and the outwardly directed face of the rim 14 adjacent the inner portion 54 of the well 34 are aligned as illustrated in FIG. 2 in a suitable fixture 60. A pair of gas metal arc welding electrodes 62A and 62B butt welds both the outside and inside of the wheel assembly 10. One of the pair of electrodes 62A is positioned on the outside of the full face wheel assembly 10 whereas the other of the pair of electrodes 62B is disposed on the inside of the wheel assembly 10. The electrodes are arranged in opposition, that is, 180 degrees apart such that the instantaneous welding site of the electrode 62A is 180 degrees and on the opposite side of the wheel assembly 10 from the other electrode 62B. The electrode 62A on the outside of the assembly 10 forms a weld 64A about the junction of the disc 12 and rim 14. The welds 64A and 64B extend 360 degrees about the full circumference of the junction of the disc 12 and rim 14. Alternatively, the disc 12 and the rim 14 may be welded together by electron beam welding. Because the electron beam welding process generates less and more localized heat, a single welding beam is suitable.

Figure 3:
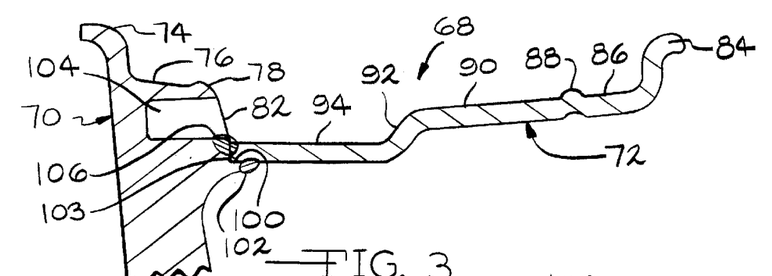
FIG. 3 is a fragmentary sectional view through a first alternate embodiment of a full face wheel of the present invention.

Referring now to FIG. 3, the first alternate embodiment of a full face wheel assembly according to the present invention is illustrated and designated by the reference numeral 68. The first alternate embodiment full face wheel assembly 68 includes a disc 70 and rim 72 both configured similarly to the disc 12 and rim 14 of the preferred embodiment wheel assembly 10. That is, the disc 70 includes a bead retaining flange 74, a bead seat 76, an outboard safety hump 78 and an outboard deep well side wall 82. Similarly, the rim 72 includes an inner bead retaining flange 84, an inner bead seat 86, an inner safety hump 88, a leg 90, an inner deep well side wall 92 and a deep well section 94. The disc 70 also includes an inwardly axially extending shoulder 100 which receives the outboard end of the deep well section 94. A continuous circumferential weld 102 is disposed between the inside surface of the deep well section 94 and a radially extending face 103 of the disc 70 adjacent the shoulder 100. Alternatively, a continuous circumferential weld 106 may be disposed on the outside (tire) surface of the deep well section 94 adjacent the lightener pockets 104. If desired, both the inner circumferential weld 102 and the outer circumferential weld 106 may be utilized for improved strength and ruggedness. The incorporation of the shoulder 100 facilitates alignment of the disc 70 and the rim 72.

Figure 4:
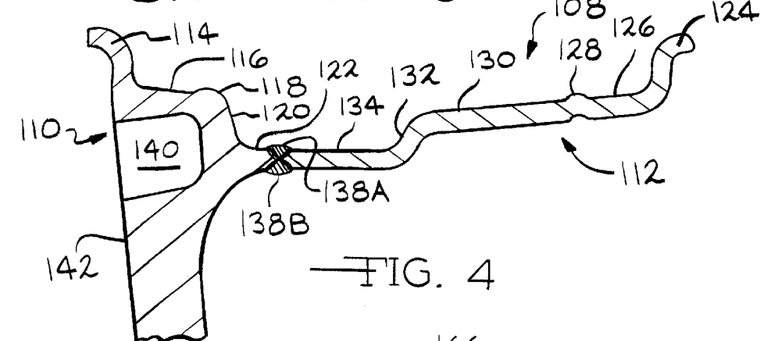
FIG. 4 is a fragmentary sectional view through a second alternate embodiment of a full face wheel according to the present invention.

Referring now to FIG. 4, a second alternate embodiment of the full face wheel assembly is illustrated and designated by the reference numeral 108. The second alternate embodiment full face wheel assembly 108 includes a disc 110 and a rim 112. The disc 110 includes an outboard bead retaining flange 114, an outboard bead seat 116, an outboard safety hump 118, an outboard deep well side wall 120 and a portion 122 of the deep well. Likewise, the rim 112 includes an inboard bead retaining flange 124, an inboard bead seat 126, an inboard safety hump 128, a leg 130, an inboard deep well side wall 132 and an inboard portion 134 of the deep well. The disc 110 also includes inner and outer welds 138A and 138B which may be achieved in accordance with the above disclosure relating to FIG. 2. The disc 110 includes lightener pockets 140 which extend axially inwardly from the outside face 142 of the disc 110. It will be appreciated that the material removed to form the lightener pockets 140 results in similar weight savings as that enjoyed with regard to the preferred embodiment wheel assembly 10 and the first alternate embodiment 68. Since the lightener pockets 140 are visible from the outside of the full face wheel 108, various aesthetic patterns and appearances may be achieved in this manner.

Figure 5:
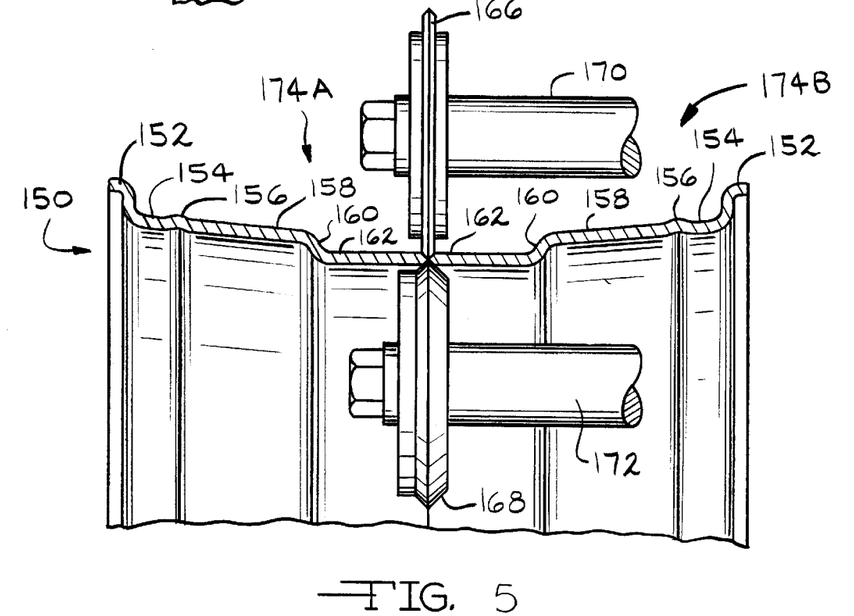
FIG. 5 is a sectional view through a rolled rim preform illustrating a rim splitting operation for producing two rims for use in making full face wheels according to the present invention.

Referring now to FIG. 5, a method for producing the rims 14 will now be discussed. A rim 150 is formed, as noted previously, by forming a flat strip of metal such as aluminum, magnesium or other material into a hoop and butt welding the ends together. The hoop is then roll formed into the rim 150 illustrated in FIG. 5. The rim 150 includes inner and outer bead seat flanges 152, a pair of bead seats 154, a pair of safety humps 156, a pair of legs 158, a pair of deep well side walls 160 and well portions 162. The rim 150 is positioned in a fixture (not illustrated) which rotates the rim 150 about its axis. An outside roll cutter 166 and an inside roll cutter 168 are mounted upon spindles 170 and 172, respectively. The roller cutters 166 and 168 engage the preform rim 150 at its axial mid-point which is the middle of the deep well 162. The roll cutters 166 and 168 split the rim 150 into two identical rim portions 174A and 174B. Alternatively, and if desired, the plane of operation of the roller cutters 166 and 168 may be shifted axially to produce rim portions 174A and 174B having distinct axial dimensions for use in various applications.

Figure 11:
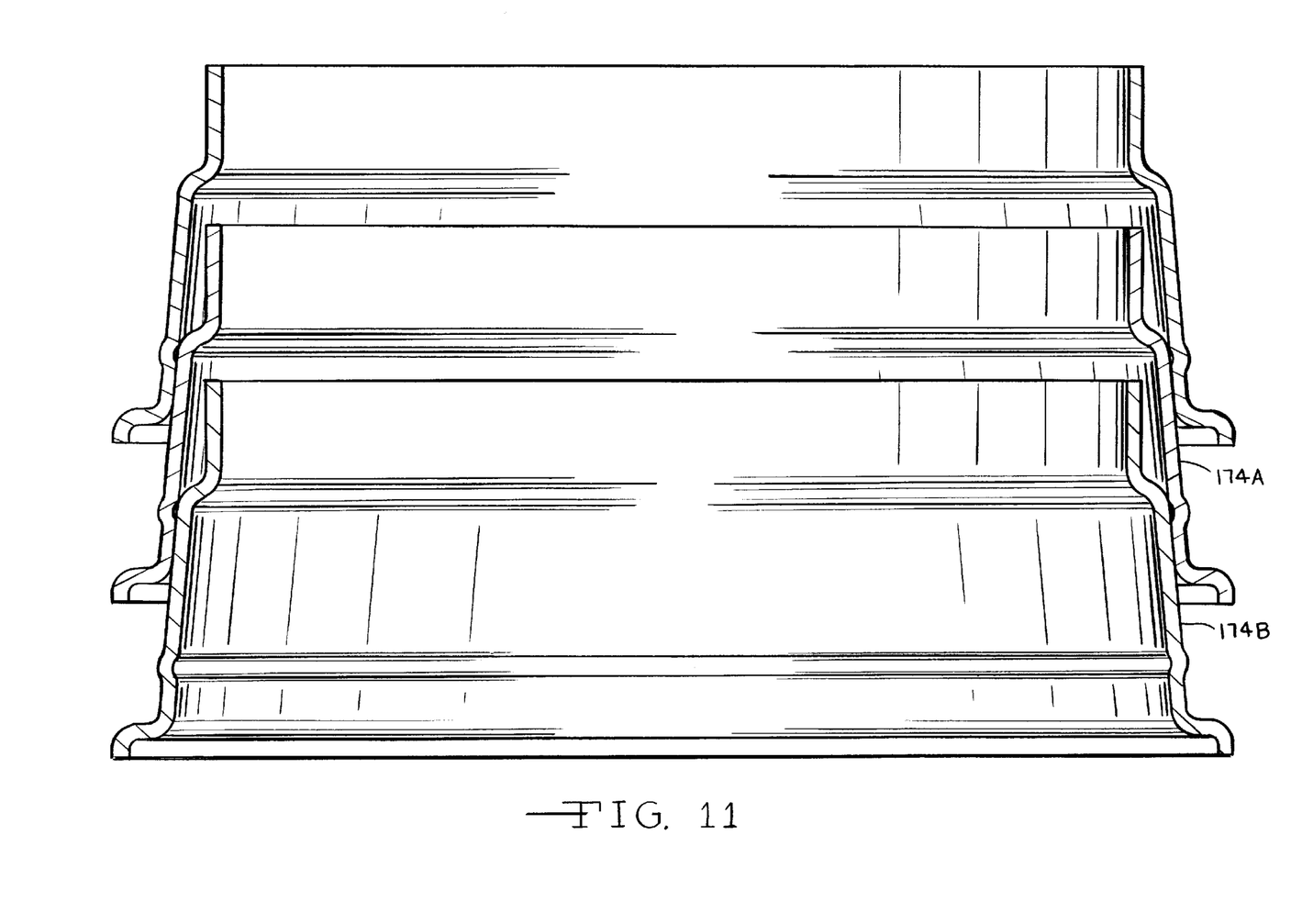
FIG. 11 is a full sectional view taken through a stack of rims according to the present invention.

As illustrated in FIG. 11, the rim portions 174A and 174B may be nested. By so doing, the space occupied by any given rim portion 174A or 174B is reduced to less than half. Accordingly, the number of rims 174A and 174B that may be stored in a given volume is at least doubled or the storage space occupied by a given number of rims may be reduced by at least one-half. Because of the reduced volume of the components, transportation costs may be reduced as well.

Figure 7:
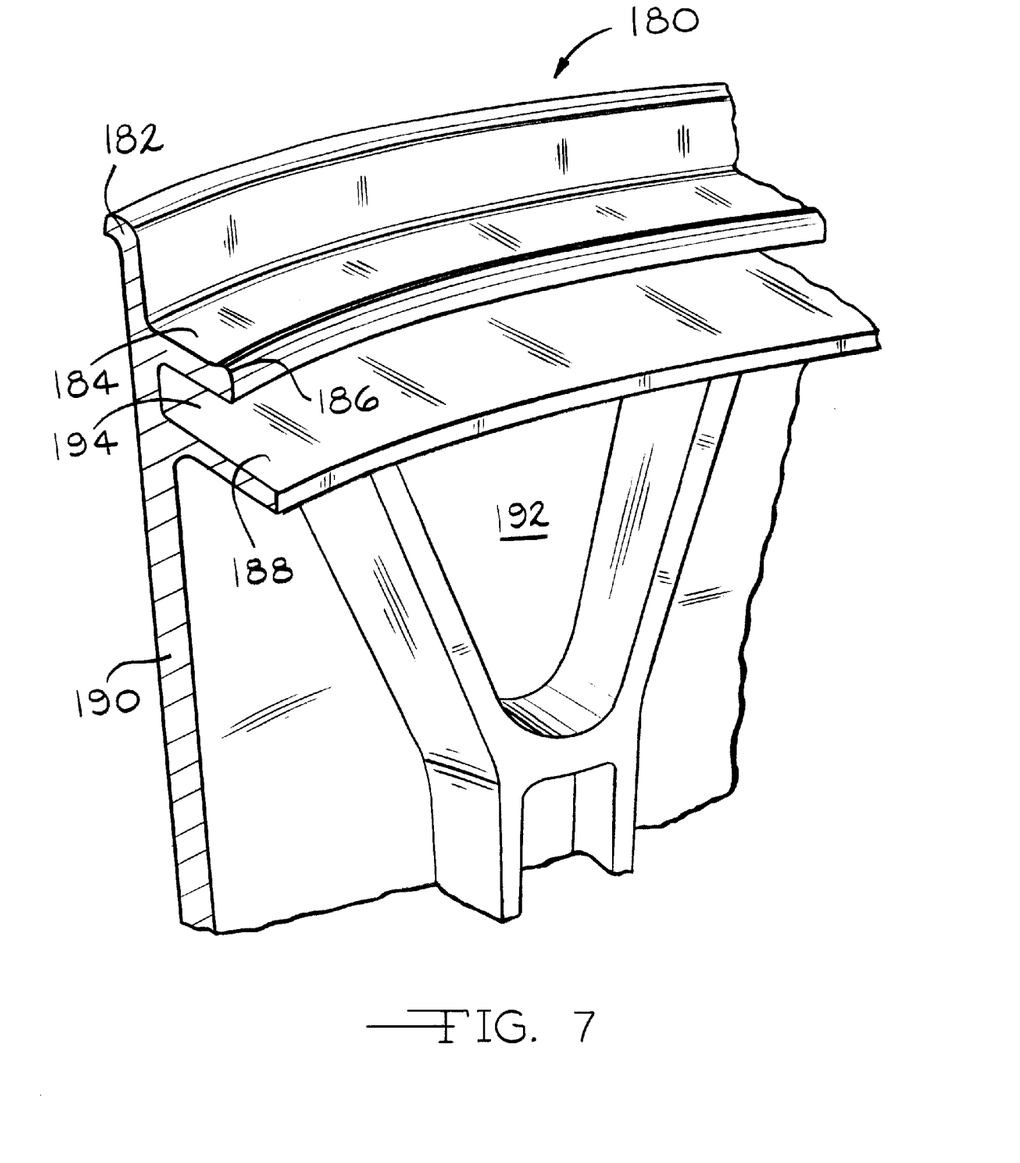
FIG. 7 is a rear perspective view of a portion of a full face disc according to a third alternate embodiment of the present invention illustrating a continuous re-entrant channel disposed adjacent the bead seat.

Turning now to FIG. 7, a third alternate embodiment disc 180 is illustrated. The third alternate embodiment disc 180 includes an outer bead retaining flange 182, a bead seat 184, a safety hump 186 and a portion of the deep well 188. The face of the disc 180 may define spokes 190 and apertures 192 to provide any desired decorative, aesthetic pattern. In the third alternate embodiment disc 180, the webs 36 of the lightener pockets 38 illustrated in FIG. 6 have been removed and a lightener channel 194 extends continuously around the disc 180 below, that is, radially inwardly from the bead seat 184 and the safety hump 186. Through the elimination of the webs 36 the weight reduction is greater still. The moment of inertia of the third alternate embodiment disc 180 is also further reduced. If desired, a continuous lightener channel or pocket 194 may open to the outside, that is, toward the face of the disc 180 in the manner illustrated in FIG. 4 and be closed in the direction of the bead seat and deep well portion 188.

Figure 8:
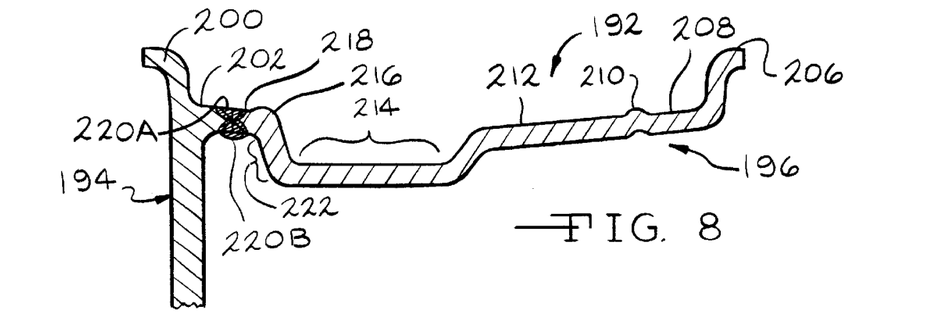
FIG. 8 is a fragmentary sectional view through a full face wheel according to a fourth alternate embodiment of the present invention.

Referring now to FIG. 8, a fourth alternate embodiment of the present invention is illustrated and generally designated by the reference numeral 192. The fourth alternate embodiment 192 includes a disc 194 and a rim 196. The disc 194 includes an outer bead retaining flange 200 and a portion of the outer bead seat 202. The rim 196 includes an inner bead retaining flange 206, an inner bead seat 208, an inner safety hump 210, a leg 212, a deep well section 214, an outer safety hump 216 and a portion of the outer bead seat 218. The disc 194 and the rim 196 are secured together by an outer peripheral weld 220A and an inner peripheral weld 220B, preferably accomplished as described above with reference to FIG. 2. Alternatively, the welds 220A and 220B may be accomplished by single electron beam welding. In order to ensure an air tight seal between the tire bead and bead seat portions 202 and 218 adjacent the outer weld 220A, it may be desirable to machine, grind or otherwise modify the weld bead 220A to conform smoothly to the bead seat portions 202 and 218. In the fourth alternate embodiment wheel assembly 192, the inside outboard surface 222 of the well 214 may be readily machined or finished by other decorative or aesthetically pleasing processes such as painting or polishing.

Figure 9:
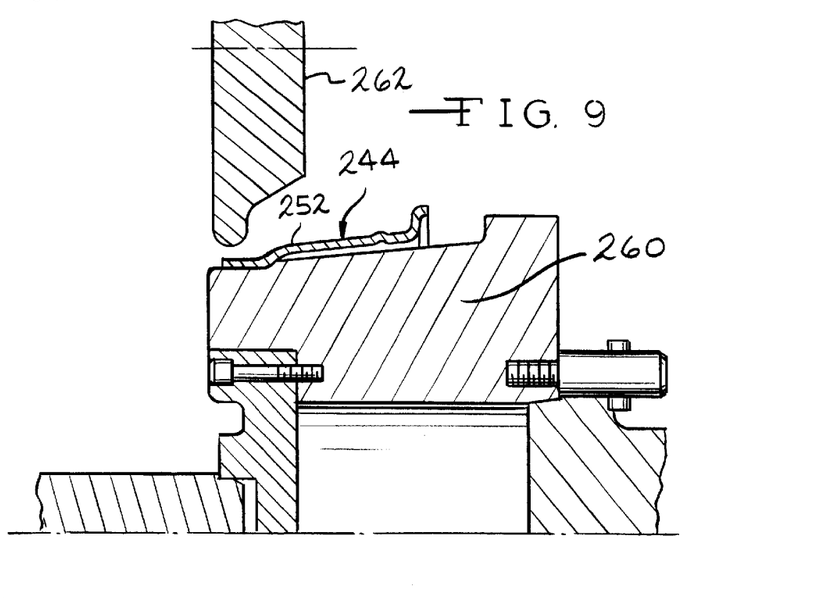
FIG. 9 is a diagrammatic view in half section of an apparatus for spin forming the rim portion of the full face wheel according to the present invention.
Figure 10:
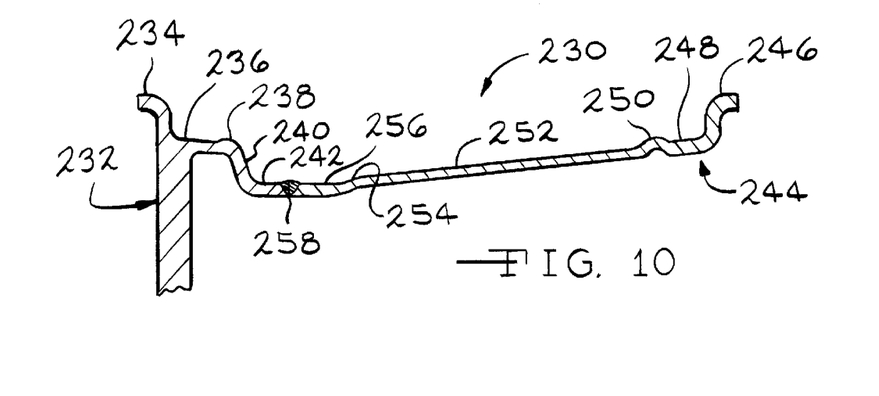
FIG. 10 is a fragmentary sectional view through a full face wheel according to a fifth alternate embodiment of the present invention.

Referring now to FIGS. 9 and 10, a fifth alternate embodiment of a full face wheel assembly is illustrated and generally designated by the reference numeral 230. The fifth alternate embodiment full face wheel assembly 230 may be similar to either the preferred embodiment wheel assembly 10 or one of the alternate embodiments disclosed above. Accordingly, the fifth alternate embodiment wheel assembly 230 includes a disc 232 having an outer bead retaining flange 234, a bead seat 236, a safety hump 238, a deep well side wall portion 240 and a portion of the deep well 242. A rim 244 includes an inner bead retaining flange 246, an inner bead seat 248, an inner safety hump 250, a leg 252, a deep well side wall portion 254 and a portion of the deep well 256. The inner leg 252 may be extended axially by spin forming to widen the axial spacing between the bead seats 236 and 248 and the bead retaining flanges 234 and 246 in order to adjust the width of the fifth alternate embodiment wheel assembly 230 to accept a wide range of tire sizes. This is accomplished by engaging the rim 244 in a fixture 260 of a spin forming machine. The fixture 260 securely grips the rim 244 and rotates it about its axis. A spin forming idler wheel 262 then engages the outside face of the rim 244 in the region of the leg 252. Through multiple forming passes, the spin forming idler wheel 262 thins and axially extends the rim 244 to any desired width. The rim width presented in FIG. 10 is merely illustrative. The disc 232 and the rim 244 are secured together by a weldment 258 which may be like or similar to any of the weld configurations discussed above. It will be appreciated that this spin forming technique facilitates the fabrication of a variety of wheel assemblies 230 having various rim widths from a rim 244 initially having a single, standard width.

It will be appreciated and understood that the above described preferred and alternate embodiments of the full face wheel, disc and rim according to the present invention may be selected and combined to form numerous variations. That is, a certain weld location may be combined with a certain lightener pocket configuration and rim arrangement to form combinations other than those specifically described herein. It should be understood that such variations and combinations are an integral and recognized aspect of this invention and wholly within the scope of this patent.

The foregoing disclosure is the best mode devised by the inventors for practicing this invention. It is apparent, however, that methods and apparatus incorporating modifications and variations will be obvious to one skilled in the art of full face vehicle wheels. Inasmuch as the foregoing disclosure is intended to enable one skilled in the pertinent art to practice the instant invention, it should not be construed to be limited thereby but should be construed to include such aforementioned obvious variations and be limited only by the spirit and scope of the following claims.

We claim:

1. A method for producing a vehicle wheel assembly comprising the steps of:
    (a) providing a wheel disc which includes an outboard tire retaining flange;
    (b) forming a unitary dual rim preform comprising two connected partial wheel rims, the preform formed with an inboard tire retaining flange connected to an inboard tire bead seat at each axial end;
    (c) determining a distinct axial length for each partial wheel rim;
    (d) splitting the preform to produce two separate partial wheel rims having predetermined axial lengths, each partial wheel rim including an inboard tire retaining flange connected to an inboard tire bead seat at one axial end and a joining edge at an opposite axial end;
    (e) positioning the wheel disc and one of the partial wheel rims in a fixture for locating the disc and the rim coaxially with the joining edge of the wheel rim adjacent to a portion of the wheel disc; and
    (f) attaching the wheel disc to the wheel rim to form the wheel assembly.

2. A method for producing a wheel as recited in claim 1 wherein step (f) includes welding the wheel disc to the wheel rim.

3. A method for producing a wheel as recited in claim 2 wherein the weld is a continuous circumferential weld.

4. A method for producing a wheel as recited in claim 1 wherein each partial wheel rim formed in step (d) further includes a wheel rim leg connected to the inboard tire bead seat, a deep well connected to the wheel rim leg and an outboard tire bead seat portion connected to the deep well, where the outboard tire bead seat portion includes the joining edge.

5. A method for producing a wheel as recited in claim 1 wherein the wheel disc provided in step (a) further includes an outboard tire bead seat connected to the outboard tire retaining flange and an outboard well side wall connected to the outboard tire bead seat and the wheel rim formed in step (d) includes a wheel rim leg connected to the inboard tire bead seat, an inboard well side wall connected to the wheel rim leg and at least a portion of a well bottom connected to the inboard well side, the portion of the well bottom including the joining edge and further wherein step (e) includes positioning the wheel rim well bottom abutting the wheel disc outboard well side wall.

6. A method for producing a wheel as recited in claim 5 wherein step (f) includes welding the wheel rim and the wheel disc together where the rim portion of the well bottom abuts the wheel disc well side wall.

7. A method for producing a wheel as described in claim 6 wherein step (b) includes forming a double well bottom at a center position in the unitary dual rim preform.

8. A method for producing a wheel as recited in claim 1 wherein step (b) includes forming a double well bottom at a center position in the unitary dual rim preform and step (d) includes splitting the preform at a selected point on the double well portion to arrive at a pair of partial rims each having a cylindrical well portion of a desired width and which includes the joining edge, the desired width being measured from the inboard tire bead seat.

9. A method for producing a wheel as recited in claim 8 wherein step (e) includes positioning the wheel disc relative to the wheel rim whereby a tire having two sealing beads may be seated on respective tire bead seats of the wheel disc and wheel rim.

10. A method for producing a wheel as recited in claim 1 wherein the predetermined axial lengths of each of the partial wheel rims formed in step (d) are different from one another.

11. A method for producing a wheel as recited in claim 1 wherein the wheel disc provided in step (a) is cast.

* * * * *

UNITED STATES PATENT AND TRADEMARK OFFICE
CERTIFICATE OF CORRECTION

PATENT NO. : 6,240,638 B1
DATED : June 5, 2001
INVENTOR(S) : Kenneth R. Archibald, et al.

Page 1 of 1

It is certified that error appears in the above-identified patent and that said Letters Patent is hereby corrected as shown below:

<u>Column 8, claim 5,</u>
Line 13, after "side" insert -- wall --.

Signed and Sealed this

Thirteenth Day of November, 2001

Attest:

*Attesting Officer*

NICHOLAS P. GODICI
*Acting Director of the United States Patent and Trademark Office*